United States Patent
Oklejas, Jr.

(10) Patent No.: US 10,710,024 B2
(45) Date of Patent: *Jul. 14, 2020

(54) METHOD AND SYSTEM FOR PERFORMING A BATCH REVERSE OSMOSIS PROCESS USING A TANK WITH A MOVABLE PARTITION

(71) Applicant: Fluid Equipment Development Company, LLC, Monroe, MI (US)

(72) Inventor: Eli Oklejas, Jr., Newport, MI (US)

(73) Assignee: FLUID EQUIPMENT DEVELOPMENT COMPANY, LLC, Monroe, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/285,784

(22) Filed: Feb. 26, 2019

(65) Prior Publication Data

US 2019/0184339 A1 Jun. 20, 2019

Related U.S. Application Data

(63) Continuation of application No. 15/924,421, filed on Mar. 19, 2018, now Pat. No. 10,293,306, which is a
(Continued)

(51) Int. Cl.
*B01D 61/02* (2006.01)
*B01D 61/06* (2006.01)
(Continued)

(52) U.S. Cl.
CPC .......... *B01D 61/025* (2013.01); *B01D 61/06* (2013.01); *B01D 61/08* (2013.01); *B01D 61/12* (2013.01);
(Continued)

(58) Field of Classification Search
None
See application file for complete search history.

(56) References Cited

U.S. PATENT DOCUMENTS

| 659,930 A | 10/1900 | Kemble |
| 893,127 A | 7/1908 | Barber |

(Continued)

FOREIGN PATENT DOCUMENTS

| DE | 19941349 A1 | 3/2001 |
| DE | 19945978 A1 | 8/2001 |

(Continued)

OTHER PUBLICATIONS

El-Sayed, et al., "Performance evaluation of two RO membrane configurations in a MSF/RO hybrid system"; Desalination, Elsevier, Amsterdam, NL, vol. 128, No. 3, May 1, 2000 (May 1, 2000), p. 231-245, XP004204830; ISSN 0011-9164; pp. 232-234; Figure 1.
(Continued)

*Primary Examiner* — Krishnan S Menon
(74) *Attorney, Agent, or Firm* — Harness, Dickey & Pierce, P.L.C.

(57) ABSTRACT

A reverse osmosis system and method of operating the same includes a membrane housing comprising a reverse osmosis membrane therein. The membrane housing has a feed fluid input, a brine outlet and a permeate outlet; The system further includes a charge pump, a plurality of valves and a tank having a volume comprising a movable partition dividing the volume into a first volume and a second volume. The plurality of valves selectively couples the charge pump to the first volume or the second volume and the brine outlet to the second volume or the first volume respectively.

18 Claims, 12 Drawing Sheets

Related U.S. Application Data continuation of application No. 15/783,184, filed on Oct. 13, 2017, now Pat. No. 9,975,089.

(60) Provisional application No. 62/409,021, filed on Oct. 17, 2016.

(51) Int. Cl.
   B01D 61/12 (2006.01)
   B01D 61/08 (2006.01)
   C02F 1/26 (2006.01)
   C02F 1/44 (2006.01)

(52) U.S. Cl.
   CPC ............. *C02F 1/265* (2013.01); *C02F 1/441* (2013.01); *B01D 2311/08* (2013.01); *B01D 2311/246* (2013.01); *B01D 2313/14* (2013.01); *B01D 2313/18* (2013.01); *B01D 2313/246* (2013.01); *B01D 2313/50* (2013.01); *C02F 2201/005* (2013.01); *C02F 2303/10* (2013.01)

(56) References Cited

U.S. PATENT DOCUMENTS

| | | | |
|---|---|---|---|
| 1,022,683 A | 4/1912 | Kienast | |
| 1,024,111 A | 4/1912 | Anderson | |
| 1,066,581 A | 7/1913 | Brown | |
| 2,715,367 A | 8/1955 | Kodet | |
| 2,748,714 A | 6/1956 | Henry | |
| 3,160,108 A | 12/1964 | Sence | |
| 3,526,320 A | 9/1970 | Kryzer | |
| 3,563,618 A | 2/1971 | Ivanov | |
| 3,614,259 A | 10/1971 | Neff | |
| 3,664,758 A | 5/1972 | Sato | |
| 3,748,057 A | 7/1973 | Eskeli | |
| 3,828,610 A | 8/1974 | Swearingen | |
| 3,969,804 A | 7/1976 | MacLnnes et al. | |
| 3,999,377 A | 12/1976 | Oklejas et al. | |
| 4,028,885 A | 6/1977 | Ganley et al. | |
| 4,029,431 A | 6/1977 | Bachl | |
| 4,070,280 A | 1/1978 | Bray | |
| 4,165,288 A | 8/1979 | Teed et al. | |
| 4,187,173 A | 2/1980 | Keefer | |
| 4,230,564 A | 10/1980 | Keefer | |
| 4,243,523 A | 1/1981 | Pelmulder | |
| 4,255,081 A | 3/1981 | Oklejas et al. | |
| 4,288,326 A | 9/1981 | Keefer | |
| 4,353,874 A | 10/1982 | Keller et al. | |
| 4,354,939 A | 10/1982 | Pohl | |
| 4,432,876 A | 2/1984 | Keefer | |
| 4,434,056 A | 2/1984 | Keefer | |
| 4,472,107 A | 9/1984 | Chang et al. | |
| RE32,144 E | 5/1986 | Keefer | |
| 4,632,756 A | 12/1986 | Coplan et al. | |
| 4,702,842 A | 10/1987 | Lapierre et al. | |
| 4,814,086 A | 3/1989 | Bratt | |
| 4,830,572 A | 5/1989 | Oklejas, Jr. et al. | |
| 4,921,603 A | 5/1990 | Yen | |
| 4,966,708 A | 10/1990 | Oklejas et al. | |
| 4,973,408 A | 11/1990 | Keefer | |
| 4,983,301 A | 1/1991 | Szucz et al. | |
| 4,983,305 A | 1/1991 | Oklejas et al. | |
| 4,997,357 A | 3/1991 | Eirich et al. | |
| 5,020,969 A | 6/1991 | Mase et al. | |
| 5,043,071 A | 8/1991 | Anselme et al. | |
| 5,049,045 A | 9/1991 | Oklejas et al. | |
| 5,082,428 A | 1/1992 | Oklejas et al. | |
| 5,106,262 A | 4/1992 | Oklejas et al. | |
| 5,132,015 A | 7/1992 | Down | |
| 5,132,090 A | 7/1992 | Volland | |
| 5,133,639 A | 7/1992 | Gay et al. | |
| 5,154,572 A | 10/1992 | Toyoshima et al. | |
| 5,320,755 A | 6/1994 | Hagqvist et al. | |
| 5,338,151 A | 8/1994 | Kemmner et al. | |
| 5,340,286 A | 8/1994 | Kanigowski | |
| 5,401,395 A | 3/1995 | Hagqvist et al. | |
| 5,482,441 A | 1/1996 | Permar | |
| 5,499,900 A | 3/1996 | Khmara et al. | |
| 5,647,973 A | 7/1997 | Desaulniers | |
| 5,702,229 A | 12/1997 | Moss et al. | |
| 5,819,524 A | 10/1998 | Bosley et al. | |
| 5,951,169 A | 9/1999 | Oklejas et al. | |
| 5,980,114 A | 11/1999 | Oklejas, Jr. | |
| 6,007,723 A | 12/1999 | Ikada et al. | |
| 6,017,200 A | 1/2000 | Childs et al. | |
| 6,036,435 A | 3/2000 | Oklejas | |
| 6,059,970 A | 5/2000 | Kohlheb et al. | |
| 6,110,360 A | 8/2000 | Hart, Jr. | |
| 6,110,375 A | 8/2000 | Bacchus et al. | |
| 6,116,851 A | 9/2000 | Oklejas, Jr. | |
| 6,120,689 A | 9/2000 | Tonelli et al. | |
| 6,139,740 A | 10/2000 | Oklejas | |
| 6,139,750 A | 10/2000 | Graham | |
| 6,187,200 B1 | 2/2001 | Yamamura et al. | |
| 6,190,556 B1 | 2/2001 | Uhlinger | |
| 6,299,766 B1 | 10/2001 | Permar | |
| 6,309,174 B1 | 10/2001 | Oklejas, Jr. et al. | |
| 6,345,961 B1 | 2/2002 | Oklejas, Jr. | |
| 6,375,842 B1 | 4/2002 | Graham | |
| 6,402,956 B1 | 6/2002 | Andou et al. | |
| 6,468,431 B1 | 10/2002 | Oklelas, Jr. | |
| 6,508,937 B1 | 1/2003 | Kawashima et al. | |
| 6,547,965 B1 | 4/2003 | Chancellor | |
| 6,589,423 B1 | 7/2003 | Chancellor | |
| 6,613,233 B1 | 9/2003 | Rusk et al. | |
| 6,709,599 B1 | 3/2004 | Rosenberger et al. | |
| 6,713,028 B1 | 3/2004 | Oklejas, Jr. | |
| 6,797,173 B1 | 9/2004 | Oklejas, Jr. | |
| 6,881,336 B2 | 4/2005 | Johnson | |
| 6,908,546 B2 | 6/2005 | Smith | |
| 6,932,907 B2 | 8/2005 | Haq et al. | |
| 6,936,140 B2 | 8/2005 | Paxton et al. | |
| 6,942,797 B1 | 9/2005 | Chancellor et al. | |
| 7,077,962 B2 | 7/2006 | Pipes | |
| 7,150,830 B1 | 12/2006 | Katsube et al. | |
| 7,285,209 B2 | 10/2007 | Yu et al. | |
| 2003/0080058 A1 | 5/2003 | Kimura et al. | |
| 2004/0007517 A1 | 1/2004 | Grangeon et al. | |
| 2004/0007526 A1 | 1/2004 | Dellby et al. | |
| 2004/0104157 A1 | 6/2004 | Beeman et al. | |
| 2004/0211729 A1 | 10/2004 | Sunkara et al. | |
| 2006/0157409 A1 | 7/2006 | Hassan | |
| 2006/0157410 A1 | 7/2006 | Hassan | |
| 2006/0226077 A1 | 10/2006 | Stark | |
| 2006/0254981 A1 | 11/2006 | Efraty | |
| 2007/0023347 A1 | 2/2007 | Chabot | |
| 2007/0056907 A1 | 3/2007 | Gordon | |
| 2007/0181497 A1 | 8/2007 | Liberman | |
| 2007/0199878 A1 | 8/2007 | Eisberg et al. | |
| 2007/0289904 A1 | 12/2007 | Oklejas | |
| 2007/0295650 A1 | 12/2007 | Yoneda et al. | |
| 2008/0023410 A1 | 1/2008 | Efraty | |
| 2008/0217222 A1 | 9/2008 | Efraty | |
| 2009/0152197 A1* | 6/2009 | Lilas | B01D 61/025 210/636 |
| 2009/0173690 A1 | 7/2009 | Oklejas, Jr. | |

FOREIGN PATENT DOCUMENTS

| | | |
|---|---|---|
| DE | 10327401 A1 | 1/2005 |
| EP | 0570350 A1 | 11/1993 |
| EP | 1022050 A2 | 7/2000 |
| EP | 1022051 A2 | 7/2000 |
| EP | 1508361 A1 | 2/2005 |
| GB | 2204664 A | 11/1988 |
| GB | 2363741 A | 1/2002 |
| GB | 2377928 A | 1/2003 |
| JP | 56091802 A | 7/1981 |
| WO | WO-97/21630 A1 | 6/1997 |
| WO | WO-97/36124 A2 | 10/1997 |
| WO | WO-00/76639 A1 | 12/2000 |
| WO | WO-0187470 A1 | 11/2001 |
| WO | WO-02/09855 A1 | 2/2002 |
| WO | WO-2005/075061 A1 | 8/2005 |

(56) References Cited

FOREIGN PATENT DOCUMENTS

| WO | WO-06/106158 A1 | 10/2006 |
| WO | WO-2007/096679 A1 | 8/2007 |
| WO | WO-07/146321 A1 | 12/2007 |

OTHER PUBLICATIONS

Geisler, et al.; "Reduction of the energy demand for seawater RO with the pressure exchange system PES"; Desalination, Elsevier, Amsterdam, NL, vol. 135, No. 1-3, Apr. 20, 2001 (Apr. 20, 2001); pp. 205-210; XP004249642; ISSN: 0011-9164; whole document.
Written Opinion and International Search Report for corresponding PCT/US2017/056967, dated Jan. 16, 2018, 14 pgs.
Ei-Sayed, et al., "Performance evaluation of two RO membrane configurations in a MSF/RO hybrid system"; Desalination, Elsevier, Amsterdam, NL, vol. 128, No. 3, May 1, 2000 (May 1, 2000), p. 231-245, XP004204830; ISSN: 0011-9164; pp. 232-234; Figure 1.

* cited by examiner

First embodiment using 3-way valves

| State | Valve States | | | | Comments |
|---|---|---|---|---|---|
| | 620 | 630 | 632 | 640 | Valve IDs |
| 1 | A | B | C | A | Making permeate from volume 614, Feed fluid enters volume 612 |
| 2 | A | B | O | A | Purging brine from volume 614 |
| 3 | B | A | C | B | Making permeate from volume 612, Feed entering volume 614 |
| 4 | B | A | O | B | Purging brine from volume 612 |
| Pump 52 may increase speed and flow during purge process | | | | | |

FIG. 7

Second embodiment using spool valve

| State | Valve States | | Comments |
|---|---|---|---|
| | SV | 632 | Valve IDs |
| 1 | A | C | Making permeate from volume 614, Feed fluid enters volume 612 |
| 2 | A | O | Purging brine from volume 614. Continues until feed has reached the membrane |
| 3 | B | C | Making permeate from volume 612, Feed fluid entering volume 614 |
| 4 | B | O | Purging brine from volume 612. Continues until feed has reached the membrane |
| Pump 52 may increase speed and flow during purge process | | | |

FIG. 9

METHOD AND SYSTEM FOR PERFORMING A BATCH REVERSE OSMOSIS PROCESS USING A TANK WITH A MOVABLE PARTITION

RELATED APPLICATION

This application is a continuation of U.S. application Ser. No. 15/924,421 filed Mar. 19, 2018 which is a continuation of U.S. application Ser. No. 15/783,184, filed Oct. 13, 2017 and claims benefit to U.S. Provisional Application 62/409,021, filed Oct. 17, 2016, the disclosures of which are incorporated by reference herein.

TECHNICAL FIELD

The present disclosure relates generally to reverse osmosis systems, and, more specifically, to a method and system for using separates volumes to enable a continuous process.

BACKGROUND

The statements in this section merely provide background information related to the present disclosure and may not constitute prior art.

Reverse osmosis systems typically use one or more membrane housings that have one or more membranes therein that are used to extract an essentially pure fluid from a solution. The desalination reverse osmosis membranes receive feed fluid from brackish or sea water and extract fresh water therefrom. Fresh water is extracted or separated when the pressure of the feed fluid exceeds the osmotic pressure of the fluid which allows permeate or product fluid to cross the semi-permeable reverse osmosis membrane. The fluid that is left on the input side to the membrane becomes higher in salt concentration because fresh water that travels through the membrane does not include the salt. The water that passes through the membrane is referred to as a permeate. The pressure required to produce fresh water is proportional to the concentration of the total dissolved solids (TDS) in this feed solution within the reverse osmosis housing. For typical ocean water, the concentration is about 35,000 parts per million (ppm) and the corresponding osmotic pressure is about 450 pounds per square inch (psi) (3,102 kPa). For 70,000 ppm feed fluid, the osmotic pressure approximately doubles to 900 psi (about 6,205 kPa). A typical seawater reverse osmosis system uses a series of membranes that recover up to about 45% of the fresh water and generate about 55% concentrate brine from the original volume of seawater. The net driving pressure (NDP) equals the feed pressure minus the osmotic pressure. The net driving pressure is the pressure energy available to drive pure fluid across the membrane.

Referring now to FIG. 1, a membrane channel 10 is illustrated between two membrane sheets 12. The channel 10 includes an inlet 14 and an outlet 16. An amount of permeate 18 represented by the droplets has permeated from the channel 10 through the membrane sheets 12. As the feed fluid that enters the inlet 14 and progresses through the membrane channel 10, the concentration of dissolved solids increases as the permeate 18 is extracted. The higher number of droplets of permeate 18 toward the inlet 14 indicate that permeate production is higher toward the inlet 14 and decreases toward the outlet 16. Because of the increasing totaled dissolved solids and the corresponding reduction in the net driving pressure, less permeate is extracted from the channel 10.

Referring now to FIG. 2, the relationship of the feed pressure, osmotic pressure, the feed total dissolved solids, the permeate rate and the net driving pressure is illustrated for a membrane channel of a reverse osmosis system with about 45% recovery handling of the seawater. As is illustrated, the feed pressure is about 860 psi (5929 kPa) and loses about 10 psi (69 kPa) over the life of the channel. The osmotic pressure at the start of the channel is about 450 psi (3,100 kPa) and rises to about 820 psi (5653 kPa) due to the increase in total dissolved solid of the feed. The feed total dissolved solid begins at about 35,000 ppm and rises to about 63,000 ppm at the end of the channel. The net driving pressure begins at about 500 psi (3450 kPa) and decreases to about 50 psi (350 kPa). The permeate flow rate decreases to negligible at the end of the channel 10.

Referring now to FIG. 3, a batch reverse osmosis system 30 is illustrated. The batch reverse osmosis system 30 is used to treat a volume of feed fluid. The process repeatedly passes an initial volume of feed fluid through the reverse osmosis membranes and removes permeate until a desired level of concentration of total dissolved solids or a specific amount of permeate has been produced. The batch reverse osmosis system 30 has a feed reservoir or source 32 that communicates fluid to a charge pump 34. The charge pump 34 communicates fluid through a valve 36 and into an inlet 38 of a tank 40. The valve 36 is open during filling of a batch tank 40 and is closed after the tank 40 is filled with feed fluid. The tank 40 may include an air vent 41 for releasing displaced air as the tank 40 is filled and drawing in air as the tank 40 is emptied. A drain valve 42 is coupled to a port 44 for draining the processed fluid into a brine tank 46 as will be described in more detail below.

An outlet port 50 communicates fluid from the tank 40 to a high pressure pump 52 through pipes 51 and 53. The high pressure pump 52 increases the pressure of the fluid from the tank 40 and communicates the fluid to the membrane housing 54 that has a membrane 56 therein. A permeate pipe 58 drains permeate that passes through the membrane 56. The permeate pipe 58 is in communication with a permeate tank 60 that collects the permeate that passes therethrough. A brine pipe 62 communicates brine concentrated fluid through a valve 64 to a port 66 in the tank 40.

A controller 70 coupled to a concentration sensor 72 monitors the process and the concentration of the fluid within the tank 40 to end the process when the fluid within the tank 40 reaches a predetermined concentration. The controller 70 may also be used to control the various valves including valve 36, the valve 64 and the pumps including the high pressure pump 52 and the charge pump 34. In the process, feed fluid is provided to the tank 40 through the charge pump 34 and open valve 36. When the tank 40 is filled, the charge pump 34 is powered off and the valve 36 is closed. As the tank 40 is filling, air is vented from the tank through the air vent 41. Drain valve 42 is also closed during the filling of the tank 40 through pipe 38. During batch processing, the high pressure pump 52 is controlled to provide pressure. The valve 64 is also opened during batch processing to circulate the concentrated brine back to the tank 40. During batch processing, fluid from the tank 40 leaves the port 50 and enters the pipe 51 whereby the high pressure pump 52 increases the pressure and provides the desired pressure to the membrane housing 54 through pipe 53. Permeate exits the membrane housing through the pipe 58. The control valve 64 is adjusted to achieve a desired flow rate and depressurized brine fluid returns to the tank 40 through port 66.

As the batch of fluid within the tank is processed, concentrated brine is recirculated back to the tank 40 which increases the concentration of the fluid within the tank 40. As the fluid becomes increasingly concentrated, the pressure output by the high pressure pump 52 is increased. The recirculation of the fluid from the tank 40 to the high pressure pump 52 through the membrane housing 54, brine pipe 62 and the valve 64 continues until the sensor 72 measures the ending concentration.

Once the desired concentration has been achieved, the high pressure pump 52 is stopped and the concentrate within the tank 40 is drained through the drain valve 42 which is opened to drain the fluid into the brine tank 46. Thereafter, the drain valve 42 is closed and the charge pump 34 is activated and the valve 36 is open to provide a fresh batch of feed fluid to the tank 40.

Referring now to FIG. 4, another prior reverse osmosis system 30' is illustrated in further detail. The same components illustrated in FIG. 3 are provided with the same reference numerals. In this example, an energy recovery device such as a turbocharger 74 having a turbine portion 74T and a pump portion 74P is used to recover at least a portion of the energy of the pressurized brine concentrate stream in the brine outlet pipe 62. That is, the brine from the membrane housing 54 is communicated to the turbine portion 74T of the turbocharger 74. The turbine 74T rotates the pump portion 74P to increase the pressure within the input line 78 to the membrane housing 54. The depressurized brine fluid returns to the tank 40 through the inlet port 66 and the valve 64. The high pressure pump 52 can operate at a lower pressure because of the boost provided by the turbocharger 74. By reducing the pump power, the added heat into the fluid is reduced. This also eliminates cooling equipment to maintain the fluid temperature to a desired batch temperature.

Referring now to FIG. 5, a similar example to that illustrated in FIG. 3 is set forth. In this example, another high pressure pump 80 is coupled between the fill reservoir 32 and the input port 38 to the tank 40. This configuration may be referred to as a "semi-batch" reverse osmosis system 30". In this example, the charge pump 34 transfers feed fluid from the reservoir 32 to entirely fill the tank 40. The valve 36 is closed. The high pressure pump 80 is used to pump feed into the fluid tank 40 from the reservoir 32. The pump 52 is engaged so that as feed is injected into the tank 40 through the feed pipe 51 and the feed fluid input pipe 53, the pressure quickly rises due to the incompressibility of the fluid. The pressure reaches the point where the permeate exits the membrane housing 54 through the permeate outlet pipe 58 into the tank 60. The permeate flow equals the rate of flow from the high pressure pump 80. As permeate is extracted, the pressure in tank 40 increase to overcome the increasing osmotic pressure in order to maintain the permeate flow into the permeate tank 60. The pump 52 circulates fluid from the tank 40 through the membrane housing 54 and back to the tank 40. Concentration sensor 72 senses the concentration of the fluid within the tank 40 and when a concentration has reached a concentration limit, the high pressure pump 80 is shut down and valve 42 is opened to allow the fluid within the tank 40 to drain into the brine tank 46. The next batch begins by opening the valve 36 and increasing the amount of fluid within the tank 40 until it is full wherein the valve 36 is closed and the high pressure pump 80 is activated to feed fluid into the tank 40 during the permeate production as described above.

SUMMARY

The present disclosure provides a method and system for batch processing feed fluid in a system that can continuously operate in an efficient manner.

In one aspect of the disclosure, a reverse osmosis system and method of operating the same includes a membrane housing comprising a reverse osmosis membrane therein. The membrane housing has a feed fluid input, a brine outlet and a permeate outlet; The system further includes a charge pump, a plurality of valves and a tank having a volume comprising a movable partition dividing the volume into a first volume and a second volume. The plurality of valves selectively couples the charge pump to the first volume or the second volume and the brine outlet to the second volume or the first volume respectively.

In another aspect of the disclosure, a method includes filling a first volume and a second volume of a tank, having a movable partition separating the first volume at a first end of the tank and the second volume at a second end of the tank, producing permeate with fluid in the second volume at a membrane housing, recirculating brine to the second volume from the membrane housing, and filling the first volume with feed fluid in response to producing permeate to cause the partition to move toward the second end until a concentration of fluid in the second volume exceeds a threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 7 is a state chart for the operating states of the valves of FIG. 6 during operation.

FIG. 9 is a state table for the operating states of the reverse osmosis system using the spool valve of FIG. 8A.

DETAILED DESCRIPTION

Figure 1:
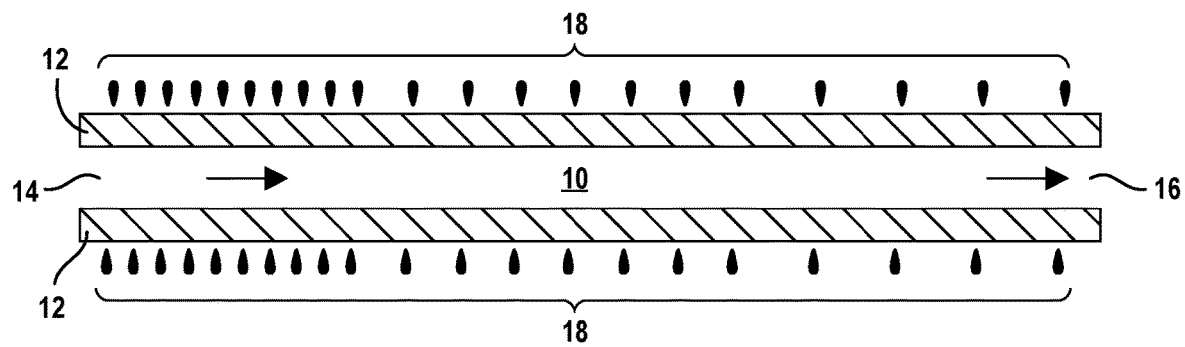
FIG. 1 is a cutaway view of a membrane and fluid flow therethrough according to the prior art.
Figure 2:
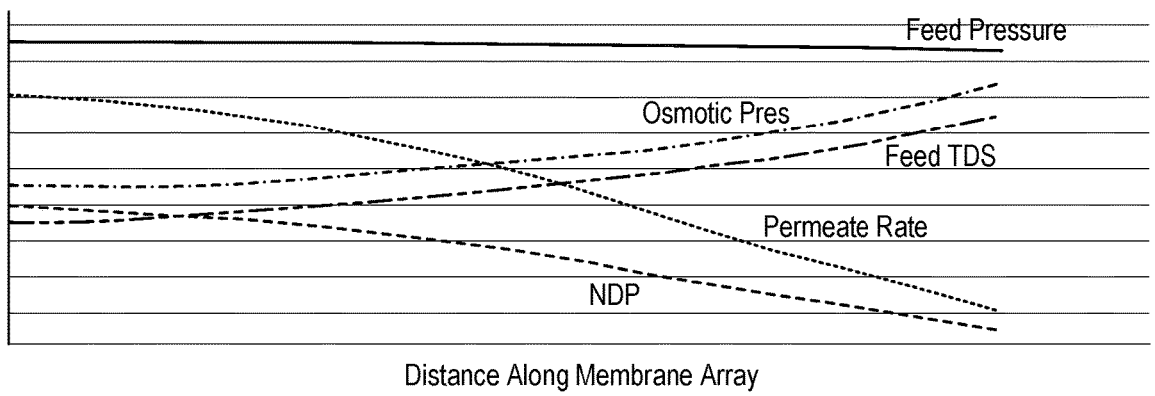
FIG. 2 is a chart of feed pressure, osmotic pressure, feed total dissolved solids (TDS), permeate rate and net driving pressure (NDP) according to the prior art.
Figure 3:
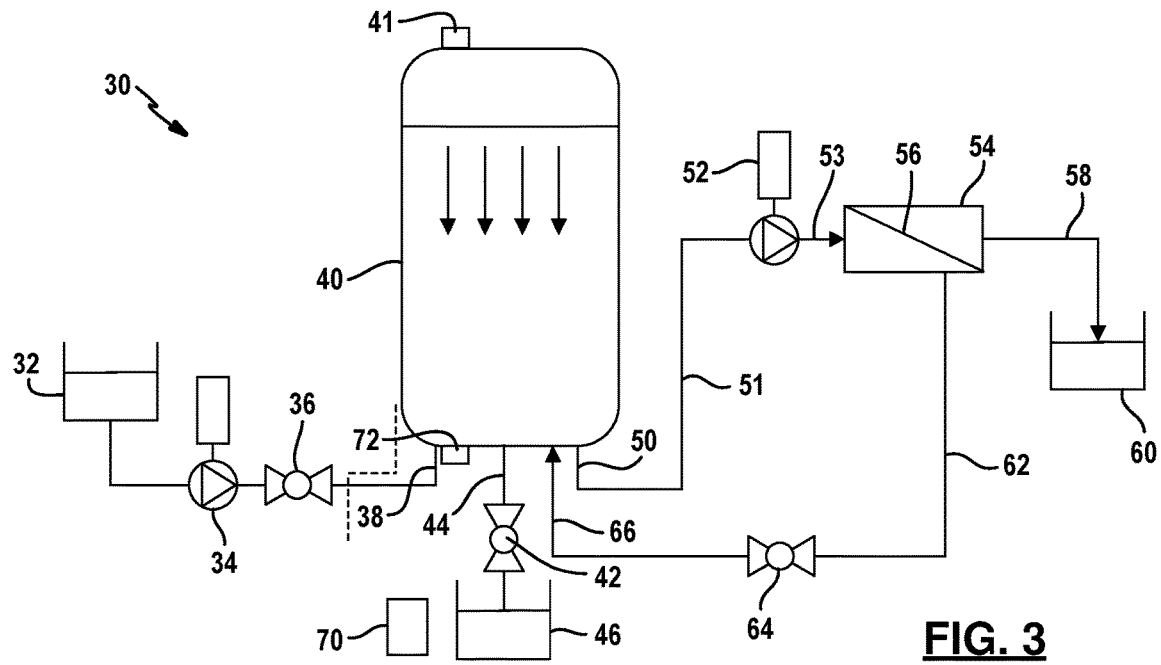
FIG. 3 is a schematic view of a reverse osmosis system according to the batch-operated reverse osmosis system according to the prior art.
Figure 4:
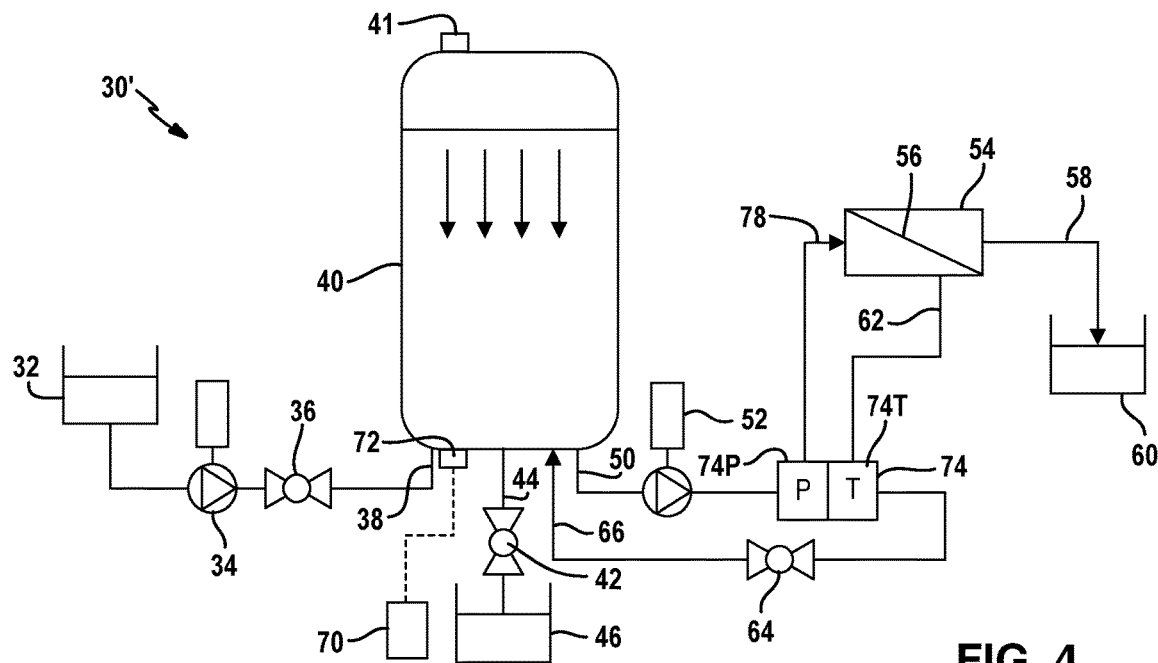
FIG. 4 is a second schematic view of a batch operated system according to the prior art.
Figure 5:
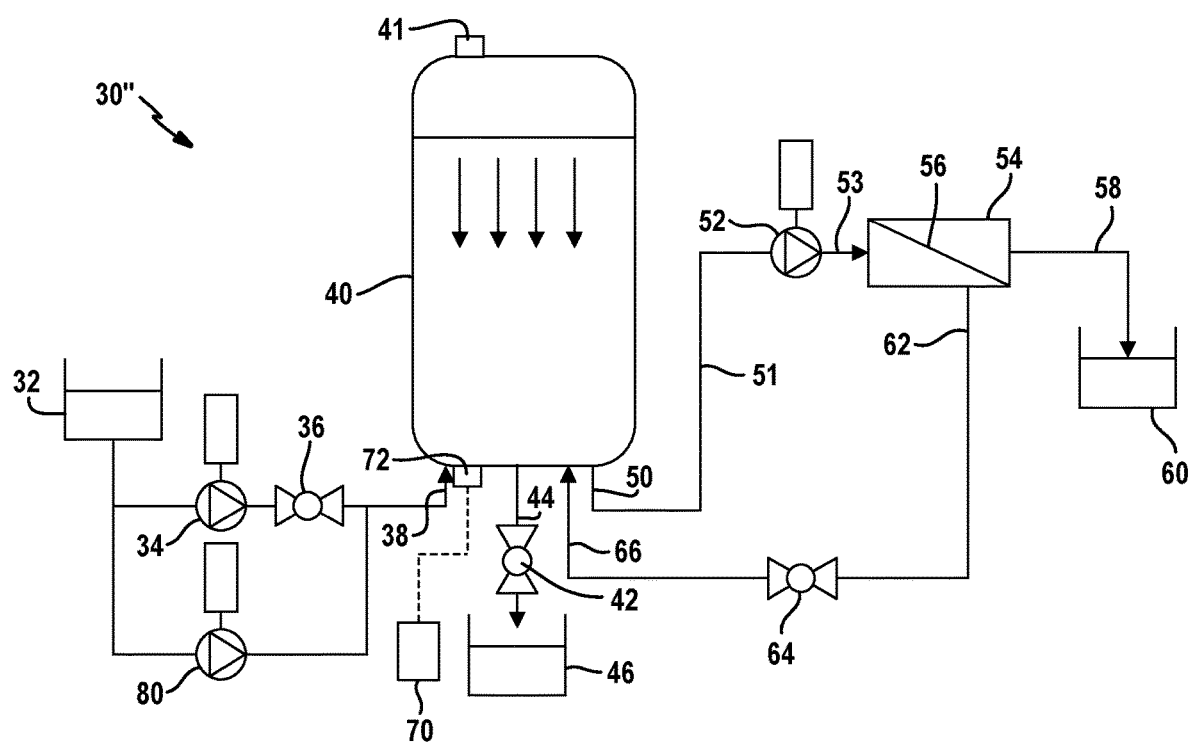
FIG. 5 is a schematic of a third batch-operated system according to the prior art.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

In the following description, a method and system for managing the reverse osmosis system to minimize energy consumption of the high pressure pump is set forth. A process that achieves continuous operation by allowing recharge of fresh feed to occur while the batch process is processing permeate is set forth.

Figure 6:
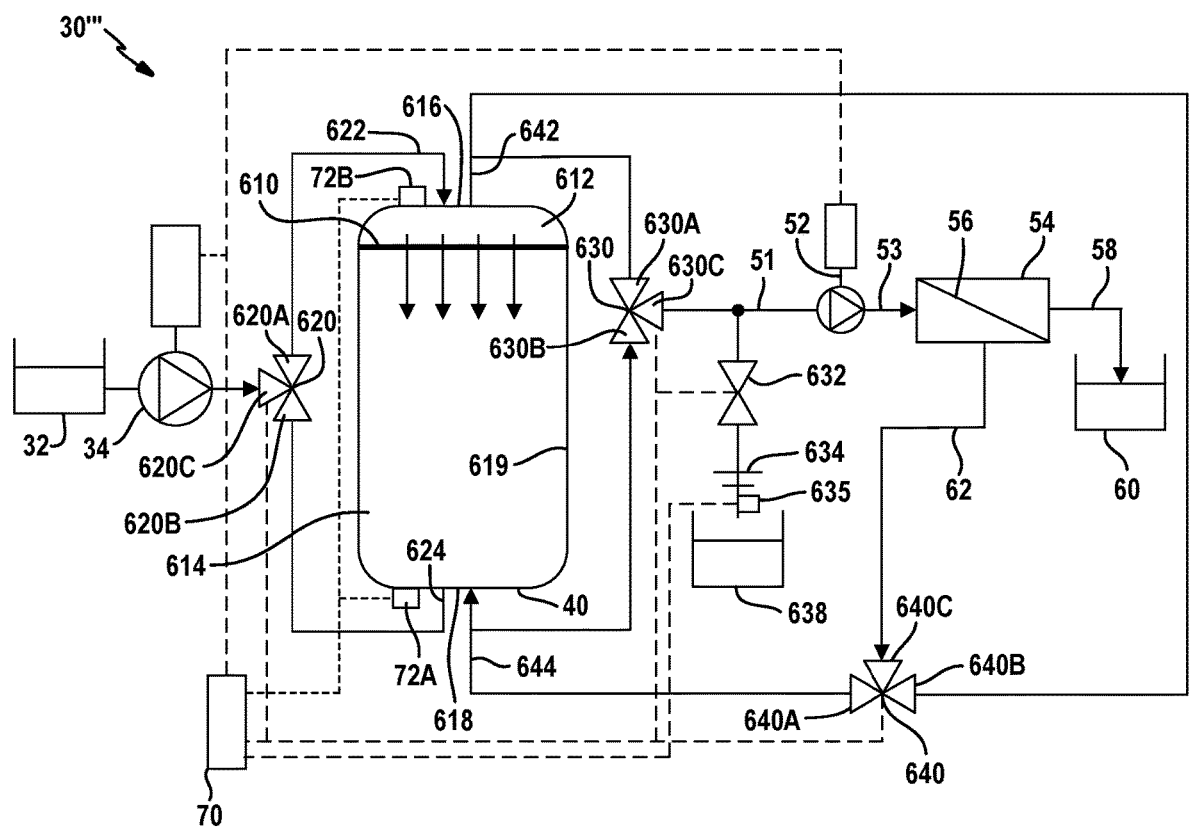
FIG. 6 is a schematic of a batch-operated system according to the disclosure.

Referring now to FIG. 6, the same elements are provided with the same reference numerals from those of FIGS. 1 through 5. In this example, the tank 40 includes a movable partition 610. The movable partition 610 divides the volume of the tank into a first volume 612 and a second volume 614. The movable partition 610 may separate the volumes 612 and 614 so that there is no mixing of fluid therebetween. That is, during the process, different salt concentrations may be with the first volume 612 and the second volume 614. The tank 40 has a first end 616 and a second end 618. The first end 616 helps define the first volume 612. The second end 618 helps define the second volume 614. A side wall 619, together with the first end 616 and the second end 618, define the entire volume within the tank 40. The tank 40 may also be various shapes. The movable partition 610 moves up and down during permeate production process. Details of this will be described below. A three-way valve 620 is used in place of the valve 36. The three-way valve communicates fluid from the feed source 32 received at port 620C and the charge pump 34 to either the first port 622 or the second port 624 of the tank 40 through valve port 620A or 620B, respectively. The valve port 620A is in communication with the port 622. The port 620B is in communication with the port 624 of the tank 40. Feed fluid is thus communicated into the first volume 612 through the port 622. Fluid is communicated into the second volume 614 through the port 624.

Another three-way valve 630 has a valve port 630A, a valve port 630B and a port 630C. The port 630C is in communication with the high pressure pump 52 and a brine drain valve 632. The brine drain valve 632 is in communication with orifices 634 and the brine reservoir 638. A total dissolved solid sensor or concentration sensor 635 may monitor the concentration of the drain or brine fluid entering the brine reservoir 638.

Another three-way valve 640 has a port 640C in communication with the brine pipe 62, a port 640B that is in communication with the port 642 (that is in communication with the first volume 612 of the tank 40) and a port 640A in communication with the port 644 which is in communication with the second volume 614 of the tank 40.

Referring now to FIGS. 6 and 7, the operation of the reverse osmosis system 30" is set forth. The states of the valves 620, 630, 632 and 640 are set forth. The fluid in the three-way valves flows into or out of the port "C" and into or out of one of the port "A" or port "B" for each valve which are denoted in the chart below. Valve 632 is a two-way valve that is either opened ("O") or closed ("C"). In the first state, the RO system 30" makes permeate at the membrane housing 54 by way of the pipe 58. The valves 620, 630, 632 and 640 may be referred to as a plurality of valves. However, the various states of the valves may allow various conditions. In the first state, the plurality of valves are set to make permeate from the volume 614 while feed fluid enters the volume 612. That is, the valve 620 is set to communicate feed fluid from the port 620C to 620A and into the port 622. It is presumed in state 1 that the tank 40 is already filled with fluid. Fluid is provided from the port 644 to valve 630 and, in particular, to port 630B of the valve 630. Fluid is communicated through the valve and port 630C to the high pressure pump 52 and membrane housing 54 where permeate is produced through the pipe 58. Leftover brine fluid from the process in the membrane housing 54 returns to the tank though the pipe 62 and port 640C and port 640A of the three-way valve 640. Fluid leaves the port 640A of the valve and enters the port 644 in the second end 618 of the tank 40. During this process, the valve 632 is closed. As the process progresses, the movable partition 610 moves in a direction toward the second end 618 or, in this example, in a downward direction. When the concentration of the fluid in the volume 614 reaches a predetermined concentration as determined by the controller 70 using the concentration sensor 72A, the process stops processing permeate from the volume 614 and purges brine fluid from the volume 614.

When brine is being purged from the volume 614, the system enters state 2, the valve states of the valves 620, 630 and 640 in state 2 are identical to those of state 1 with the exception of valve 632 which changes from closed to open. When valve 632 opens, brine continues to be pumped through the pipe 51, the high pressure pump 52, pipe 53 and the valve 632. Ultimately, the movable partition 610 moves in a downward direction at or near the second end 618.

In state 3 of FIG. 7, the valve states of valve 620, 630 and 640 are reversed from that of state 1. That is, valve 620 now communicates fluid from the port 620C through the port 620B and into the port 624 of the tank 40. Valve 630 communicates fluid from the port 642 through the port 630A and 630C of the three-way valve 630 to the pipe 51. Valve 640 communicates brine from the port 640C through the port 640A. Valve 632 is in a closed state and thus all of the fluid passing through the valve 630 enters the high pressure pump 52 and the membrane housing 54.

In state 4, brine is purged from the first volume 612. In this situation, the plurality of valves 620, 630 and 640 are in the identical state as that of state 3 with the exception being valve 632 which is placed in an open state. In state 3, the movable partition 610 moves toward the first end 616 until the sensor 72B senses a predetermined concentration of the first volume by way of the controller 70. The controller 70 then changes the state of the various valves and may change the speed of the high pressure pump 52 and the pump 34.

A few notable features set forth in FIG. 6 may be evident to those skilled in the art. Even though purging through the valve 632 takes place, when purging either the volume 612 or the volume 614, the membrane housing 54 continues to receive fluid through pipe 11, pump 52 and pipe 53 and generates permeate fluid through the permeate pipe 58.

During the process, the flow rate through the membrane housing 54 as controlled by the high pressure 52 is optimized to prevent fouling and maximize membrane efficiency. The pump 34 continues to replace the permeate within the appropriate volume of the tank 40.

The orifices 634 reduce the pressure drop across the valve to maximize the valve life and to allow the brine drain to drain until the partition has reached the bottom of the tank in state 1. The flow resistance through the valve 632 allows enough resistance so that some permeate production is performed. That is, not all of the circulated brine fluid leaves the system but rather a portion of the circulating brine fluid reaches the membrane housing 54 through the pump 52. After state 2 and prior to state 3, the pipes 51, 53 and 62 between the various components are preferably kept to a small distance so the amount of dead volume of highly concentrated brine between the transition from states 1 and 2 to states 3 and 4 is reduced to a minimum.

Reducing the amount of brine in the dead volume of some configurations may also be important.

Figure 8A:
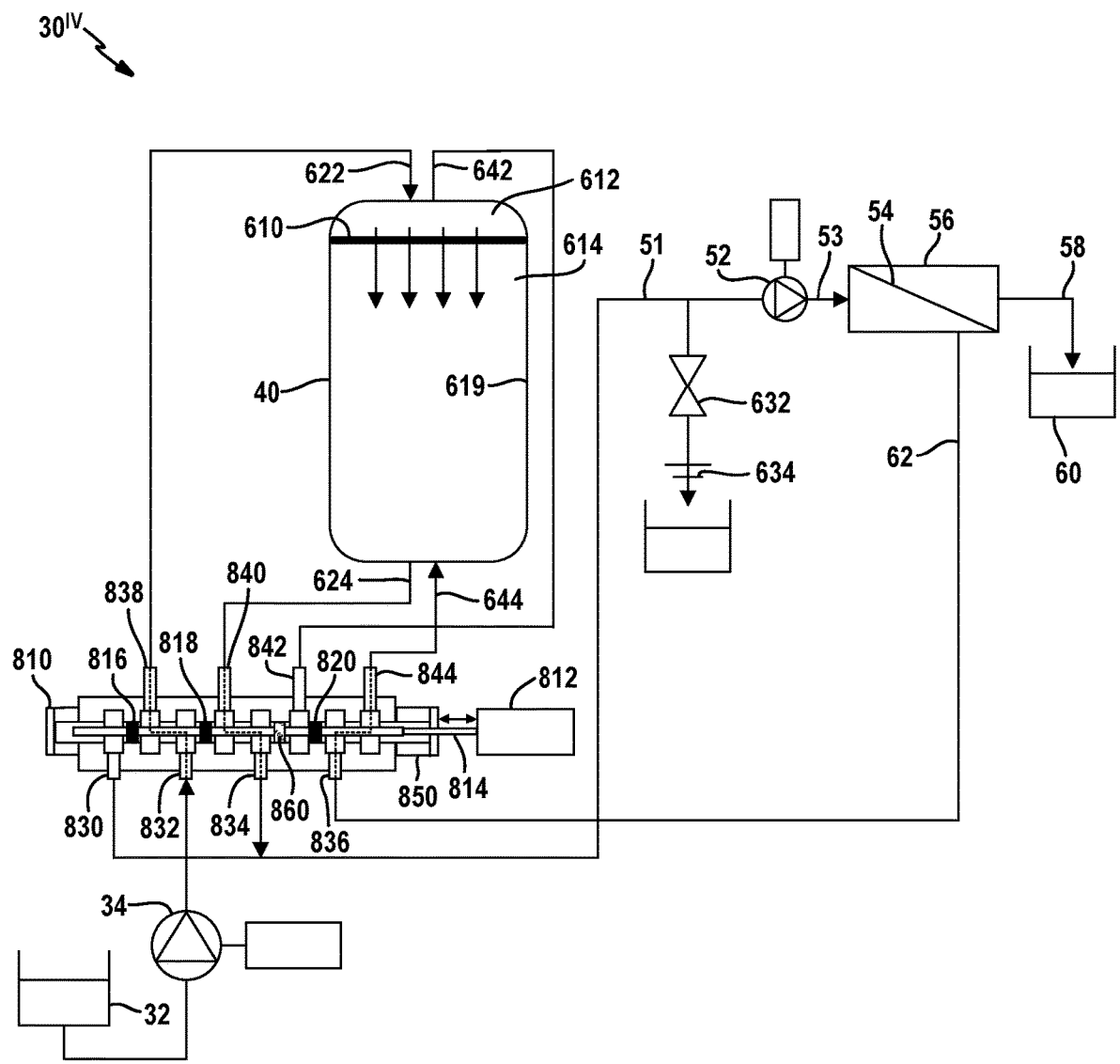
FIG. 8A is an alternative valve configuration for a reverse osmosis system.

Referring now to FIG. 8A, a spool valve 810 is used to replace the valves 620, 630 and 640 illustrated above in FIG. 6 in the reverse osmosis system 30iv. The spool valve 810 is in fluid communication with the charge pump 34, the brine pipe 62, the high pressure pump 52 and the drain valve 632.

The spool valve 810 has a linear actuator 812 that is used to move a rod 814 to align the spool disks 816, 818 and 820 to their desired position relative to the various ports 830-844 formed in the casing 850 of the spool valve 810.

It should be noted that the illustration set forth in FIG. 8A do not include the controller 70 and the electrical couplings to the various pumps and to the sensors 72A, 72B and 635. However, the sensors may also be provided in FIG. 8 in the same manner as FIG. 6.

Figure 8B:
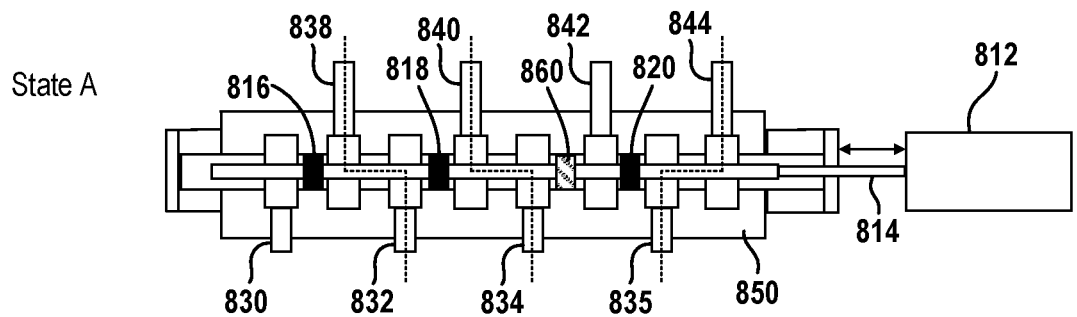
FIGS. 8B and 8C illustrate the different states of the spool valve of FIG. 8A.
Figure 8C:
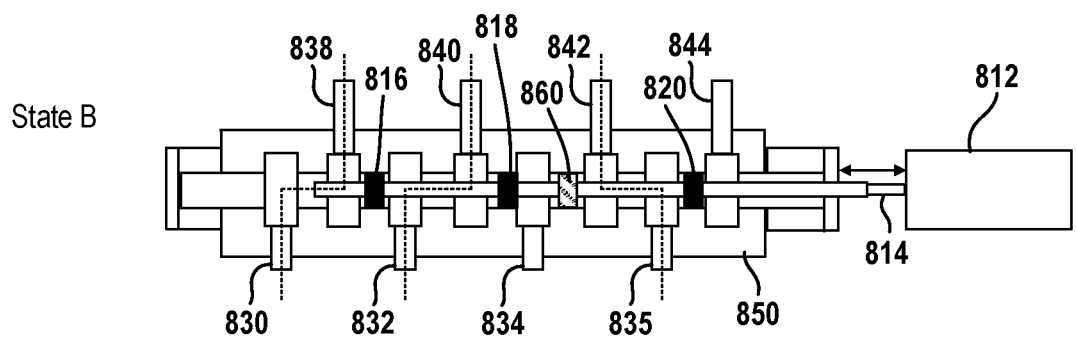

In this configuration, the linear actuator 812 is disposed in the leftmost or most outward position away from the actuator 812 position. It should also be noted that a seal 860 is disposed between the port 834 and the port 842. By providing the seal 860, the high pressure portion end or portion and the low pressure end or portion within the spool valve 810 are separated. By alignment of the disks 816, 818 and 820, different flow paths may be formed through the casing so that fluid may be provided to and from the various devices in a similar manner to that set forth in FIG. 6. FIGS. 8B and 8C illustrate state A which also corresponds to FIG. 8A and state B which corresponds to the disks 816, 818 and 820 moved to the rightmost position or toward linear activity 812 with the rod 814.

Effectively, ports 830, 838 and 832 act in a fluidically similar manner to three-way valve 620. The ports 832, 838 and 840 act in a fluidically similar manner to valve 630 and ports 842, 844 and 836 act in a fluidically similar way to valve 640.

Referring now to FIGS. 8A-8C and FIG. 9, the various states are set forth using the spool valve. In state A, permeate is made from the volume 614. Feed fluid enters volume 612. The movable partition 610 moves in a downward position during permeate production in state A. Valve 632 is closed in state 1. State A corresponds to the rod 814 being in the leftmost position. That is, state A corresponds to fluid being communicated between ports 838 and 832, between ports 840 and 834 and between ports 844 and 836. State 2 has the spool valve 810 also in state A. That is, brine is being purged from the volume 614 while feed fluid continues to reach the membrane housing 54. Pump 52 continues to operate. Valve 632 in state 2 is in an open position.

In state 3, permeate is being made from volume 612 and feed fluid is entering volume 614. In state B, fluid is being communicated between ports 830 and 838, between ports 832 and 840 and between ports 842 and 836. As noted above, during the process of permeate production, the pump 52 may be controlled to increase in speed and therefore provide higher pressure to the membrane housing 54.

Figure 10:
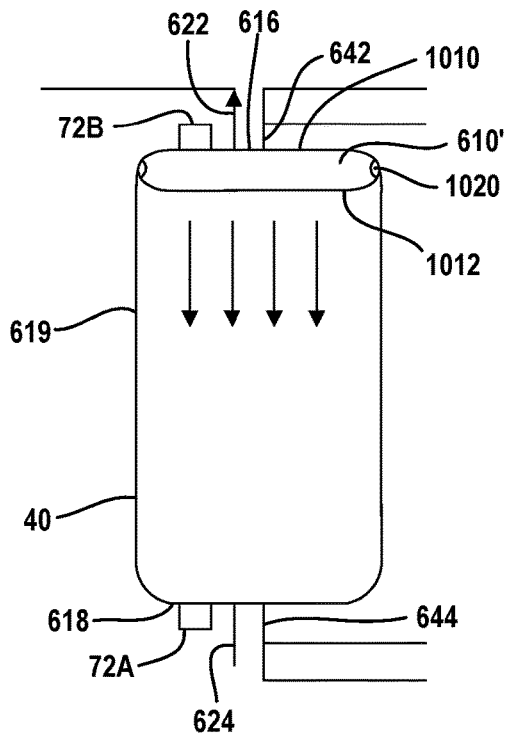
FIG. 10 is an alternative example of a tank and movable partition.
Figure 11:
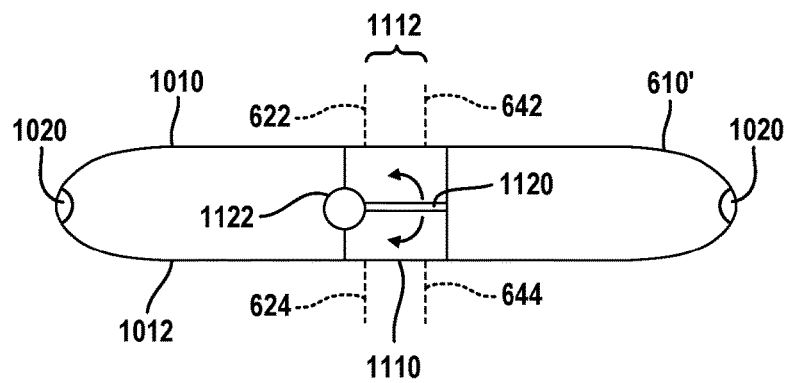
FIG. 11 is a side view of an alternative configuration for the movable partition of FIG. 10.

Referring now to FIG. 10, the movable partition 610 illustrated above may be a conformable movable partition 610' as illustrated in FIGS. 10 and 11. The movable partition 610' includes an upper surface 1010 and a lower surface 1012. The upper surface 1010 partially defines the first volume 612 of FIG. 6. The lower surface 1012 partially defines the second volume 614. The upper surface 1010 conforms to the shape of the first end 616 of tank 40. The shape of the lower surface 1012 conforms to the shape of the second end 618 of tank 40. This allows a minimization (or near elimination) of the volume 612 or 614 near the end of the process. It should be noted that the pressure difference between the upper surface 1010 and the lower surface 1012 is very minimal and thus the cost of preventing leakage around the movable partition 610' is minimal. A seal 1020 may be disposed around the movable partition 610'. A plurality of different types and shapes and numbers of seals 1020 may be provided.

Referring specifically to FIG. 11, the movable partition 610' may include a passage 1110 therethrough. The passage 1110 has a width 1112 that is wider than both of the difference between the ports 622 and 642 and ports 624 and 644. The width of the passage is defined at reference number 1112. A swinging plate 1120 may have a spring loaded pivot 1122 coupled thereto. The spring force allows the swinging plate 1120 to open only under high pressures experienced at the end of each permeate production cycle. The open position of the swinging plate 1120 is maintained until feed fluid is pumped into the tank volume and the direction of flow through the swinging plate 1120 is reversed (or the drain valve is closed). In both instance, the pressure is relieved. After relieving the pressure and the permeate production begins with the volume on the opposite side of the opening of the swinging plate 1120. The plate 1120, because it is in axial alignment with the port 622, 642, 624 and 644, allows the plate 1120 the move in the direction indicated by the arrows under high pressure. When the partition 610 moves up or down within the tank 40, the plate 1120 will remain in a closed position to prevent mixing of the volumes 612 and 614. Because there is still a "dead" volume within the pipes attached to the membrane and various pumps, feed flow continues to enter the tank and causes the partition to open under the force of the feed flow. By allowing the plate 1120 to open, some of the feed flow is able to enter the piping to flush the pipes. Thus, the highly concentrated brine is removed from the pipes and the dead volume within the pipes is eliminated. A total dissolved solid sensor 635 illustrated in FIG. 6 may be used to end the fluid flow through the plate 1120 and thus the permeate production can be resumed as the partition moves in the opposition direction. Thus, the plate 1120 will open at the bottom of the tank 40 until the TDS sensor 635 reads that a drain fluid concentration is below a drain concentration threshold which corresponds to a low amount of total dissolved solids present in feed fluid in contrast to high TDS fluid present at the end of permeate production. The sensor 635 senses the transition between the TDS amounts. Then, the plurality of valves may be changed so that feed fluid enters the bottom of the tank and permeate production is from volume 612. Likewise, when the movable partition 610' reaches the top limit of travel, the swinging plate 1120 may open and flush the piping until the TDS sensor 635 reads below a drain fluid concentration threshold. Thereafter, the plurality of the valves may change state and feed fluid provided into the volume 612 so that permeate is produced using the volume 614.

Figure 12:
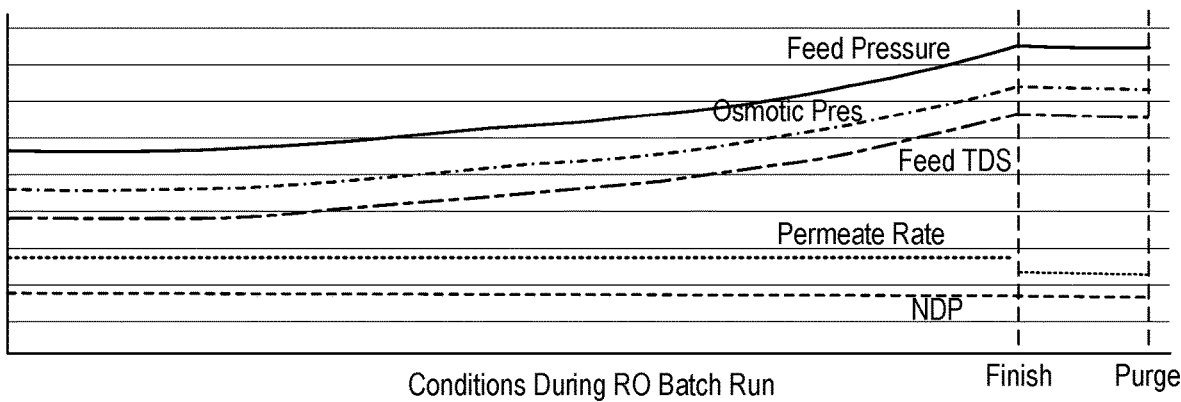
FIG. 12 is a chart illustrating feed pressure, osmotic pressure, feed total dissolved solids, permeate rate and net driving pressure according to the operation of the present examples.

Referring now to FIG. 12, the conditions during a batch operated run using the partition 610' illustrated above is set forth. As can be seen, compared to that of FIG. 2, the net driving pressure and permeate rate are relatively constant until the time between the finish and the purge. This time is relatively small and thereafter the cycle starts in the reverse direction.

By providing the partitions 610 or 610', the incoming feed fluid does not mix with the brine. This is different than the known semi-batch system described above in FIGS. 1-5. The elimination of the feed fluid and the brine mixing increases the efficiency of the overall system by preventing irreversible losses with different levels of total dissolved solids. Further, there is no disruption to the membrane production to recharge the tank after the brine has been fully processed because the tank is already charged with fresh feed on the other side of the movable partition 610 or 610' with purging of the dead volume not interrupting permeate production. The permeate production at a constant rate continues until the purge process is complete even though the process is at a slightly lower efficiency. The process only takes a short amount of time and full permeate production is then continued. Although the system undergoes a range of pressures in response to the degree of brine concentration, full depressurization is never performed. This reduces the cyclical stresses on the tank, piping and the membrane.

Figure 13:
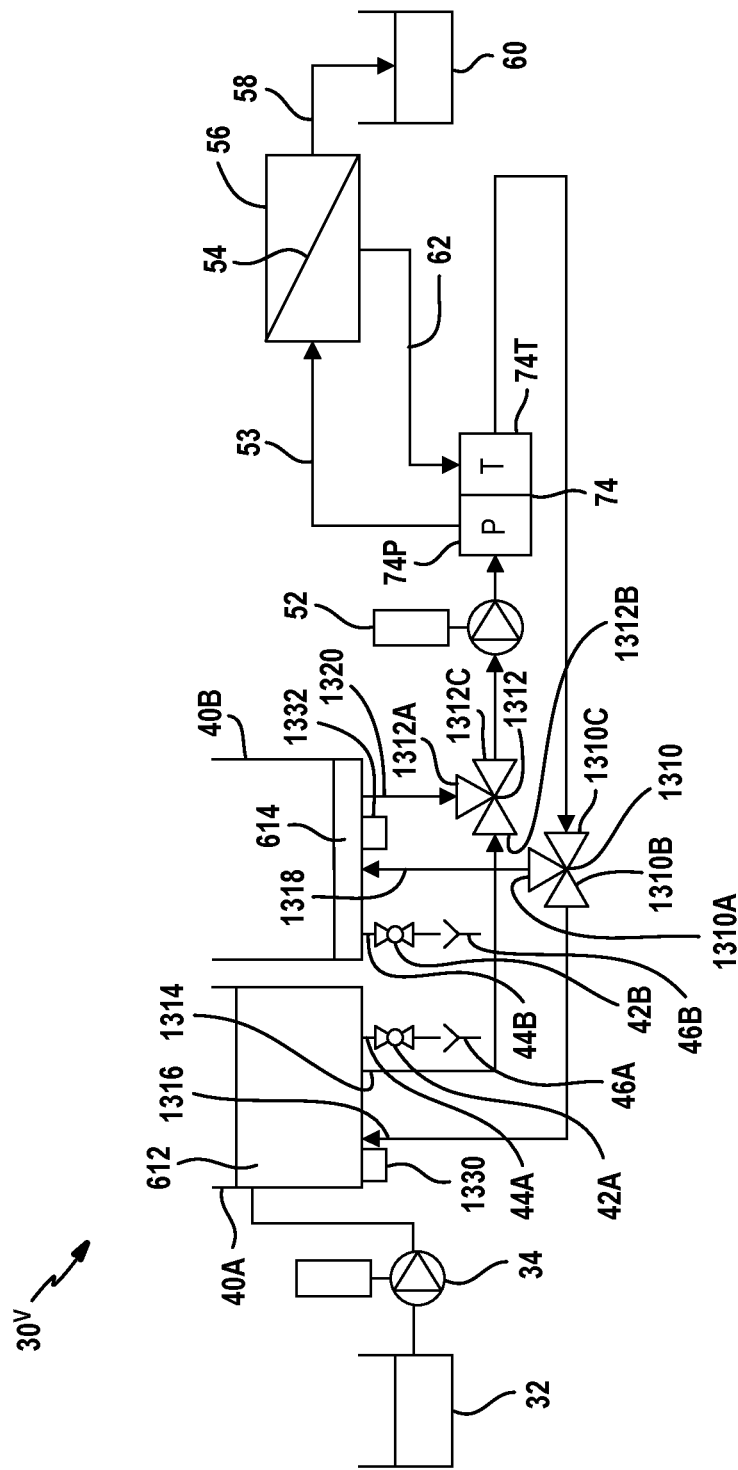
FIG. 13 is a schematic view of another example of a reverse osmosis system of the disclosure.

Referring now to FIG. 13, a reverse osmosis system 30" in this example, two tanks 40A and 40B are used to house the first volume 612 and a second volume 614 rather than having the volumes divided by the movable partition 610 as illustrated above. By providing two different volumes, relatively low cost equipment and high maximum energy efficiency may be achieved. When using the movable partition or two separate tanks, the fluid being processed is not allowed to mix with the previously processed brine and therefore the total dissolved solids in the feed are minimized. The same reference numerals for each of the components set forth previously are used in FIGS. 13, 14A and 14B. In addition to two separate volumes and two tanks 40A, 40B, two separate concentration sensors 1330 and 1332 are used in a similar manner to that used above with respect to FIG. 6. The sensors 1330, 1332 may act to detect the tank being drained as well. This may be accomplished in one sensor or two sensors at locations 1330, 1332. Further, two different drain ports 44A, 44B are in fluid communication with the drain valves 42A, 42B and the respective drain reservoirs 46A, 46B to form drain lines.

In this example, two three-way valves 1310 and 1312 are provided. In a sense, the operation of the system is nearly the same as that set forth in FIG. 6B. That is, the low pressure pump 34 fills the tank 40A with an initial fill of feed water. In state A, the three-way valve 1312 couples the port 1314 through valve ports 1312B and 1312C to the high pressure pump 52. The brine outlet pipe 62 is in communication with the port 1318 of the tank 40B through valve ports 1310C and 1310A of the valve 1310. The high pressure fluid flow passes through the turbine 74T of the turbocharger 74 to provide boost as described above in FIG. 4. The permeate exits the membrane housing 54 through the permeate pipe 58. The low pressure brine enters the tank 40B through the port 1318. Over time, the fluid level of the brine in the tank 40B increases while the fluid level of the fluid in the tank 40A decreases. To reduce the amount of time of starting the process, once enough fill fluid has entered the tank 40A, the process may start as long as the filling process is faster than the permeate production process. In the same manner described, the concentrate of the first volume 612 and the second volume 614 are monitored. Further, the drain valves 42A, 42B act in a similar manner.

Figure 14A:
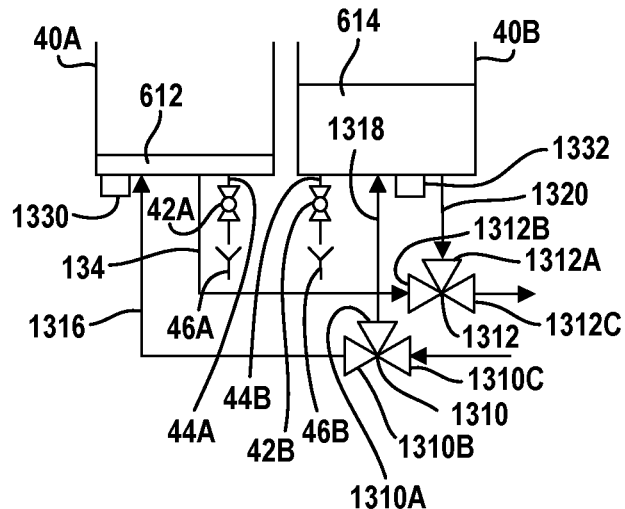
FIG. 14A is a partial schematic view of the reverse osmosis system of FIG. 13 in a first state.
Figure 14B:
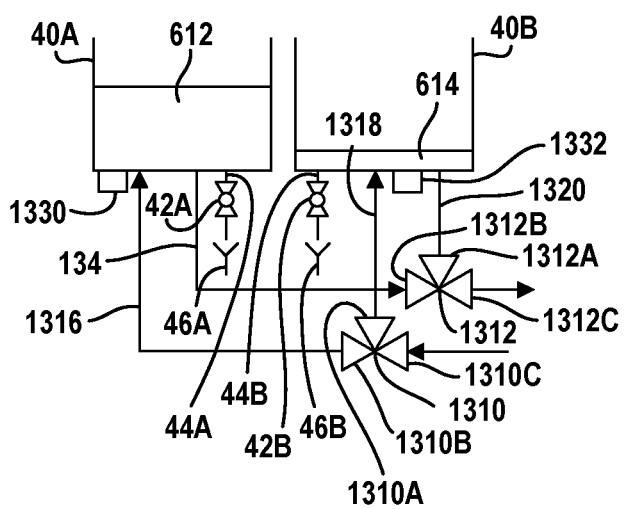
FIG. 14B is a partial schematic view of the reverse osmosis system of FIG. 13 in a second state.

Referring now to FIGS. 14A and 14B, once the liquid level of the volume 612 in tank 40A is reduced to a substantial amount such as at the bottom of the tank in FIG. 13, the states of the valves 1310 and 1312 switch to a second state in FIG. 14A. That is, valve 1312 communicates fluid from the tank 40B through port 1320 to the high pressure pump 52 through valve ports 1312A and 1312C. Port 1316 and tank 40A receive fluid from the brine pipe 62 through the turbine 74T through valve ports 1310B and 1310C. In FIG. 14A, tank 40B is reducing in level while tank 40A is filling. The high pressure pump 52 will increase the pressure in the fluid to a higher pressure due to the higher total dissolved solids. Once the level of the tank 40B reaches the bottom as indicated by sensor 1332, the valves 1310 and 1312 are switched.

Referring now to FIG. 14B, valves 1310 and 1312 are switched to operate in the manner illustrated above with respect to FIG. 13. As can be observed, the fluid level in tank 40A is reduced from the start of the process in FIG. 13. That is, each cycle produces permeate that is removed from the volume of the tanks. Once the concentration of the remaining brine or the desired amount of permeate has been reduced, drain valves 42A and 42B are open to drain the tanks 40A, 40B. It should be noted that the sensors 1330 and 1332 may act as concentration sensors or level sensors.

Figure 15A:
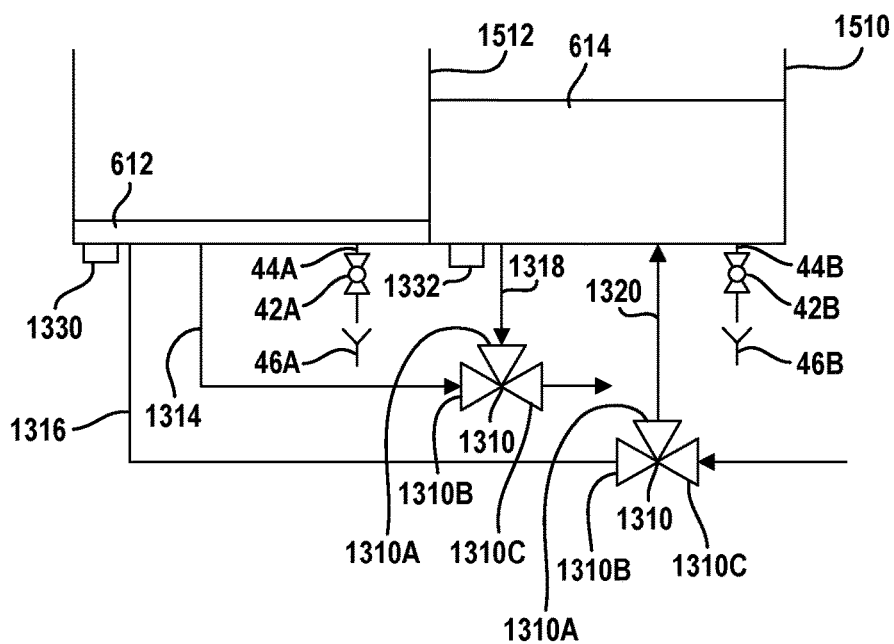
FIG. 15A is a partial schematic view of the reverse osmosis system having a common wall.
Figure 15B:
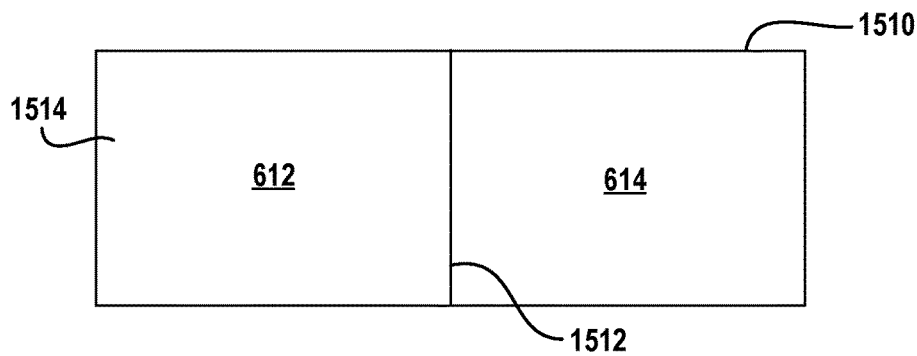
FIG. 15B is a top view of the reverse osmosis tank of FIG. 15A.

Referring now to FIGS. 15A and 15B, an alternative tank 1510 is illustrated having a common bulkhead 1512. The common bulkhead divides the tank 1510 into the first volume 612 and the second volume 614. A common outer wall 1514 may surround the entire tank.

Figure 15C:
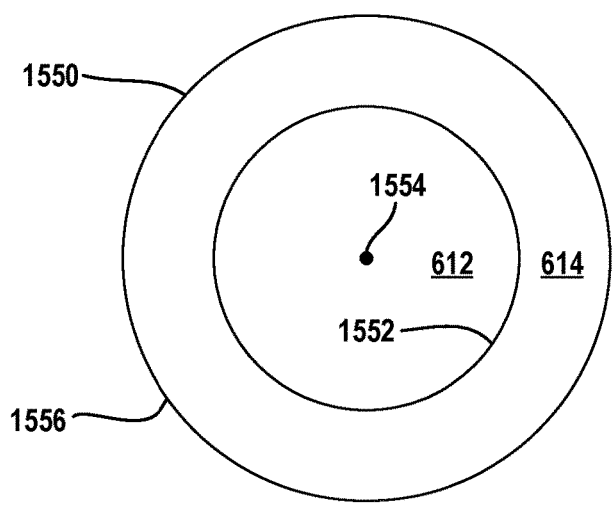
FIG. 15C is an alternative example of a common wall tank.

Referring now to FIG. 15C, another design for a tank 1550 is set forth. In this example, a first tank 1552 is cylindrical in shape, has volume 612 therein and has a longitudinal axis 1554. An outer coaxial tank 1556 has volume 614 therein and is disposed around the tank 1552. Of course, other types of designs may be provided. The advantage of providing nested or directly adjacent tanks such as that illustrated in FIGS. 15A-15C are the reduced amount of land area required to place the tanks.

Figure 16:
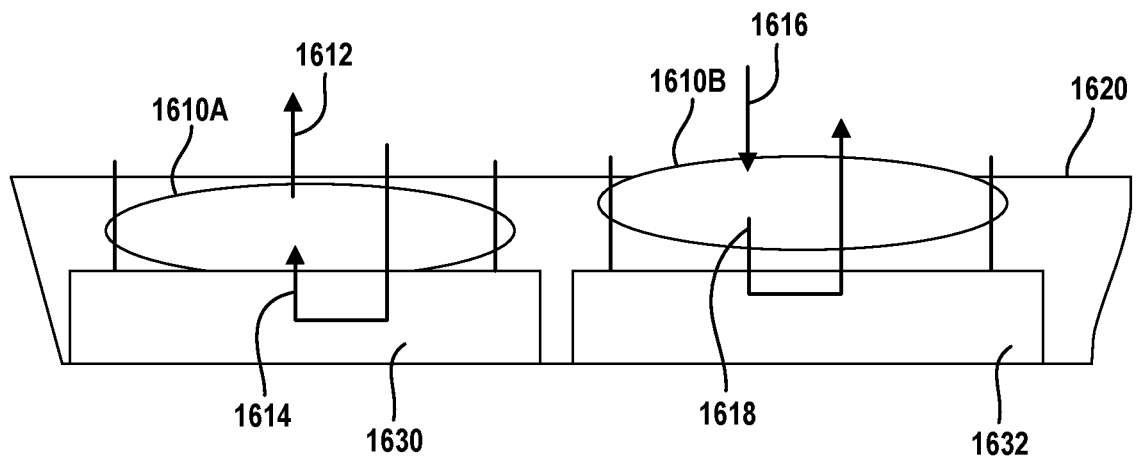
FIG. 16 is a side view of an in-water reverse osmosis tank system.

Referring now to FIG. 16, the tanks 40A and 40B may be replaced with fabric bags 1610A and 1610B. The fabric bags 1610A, 1610B have ports 1612, 1614, 1616 and 1618 that correspond to the ports 1314, 1316, 1318 and 1320, respectively, as set forth in FIG. 13. In this example, the ports 1612-1616 may be formed of flexible hoses. The bags 1610A and 1610B may be floating in water as illustrated by the water line 1620. The fabric bags 1610A, 1610B may be allowed to float in the body of water as indicated by the water level 1620 and may be located close to a reverse osmosis system in a sheltered bay directly adjacent to the reverse osmosis facility. The bags 1610A, 1610B serve the same function and hold a first volume 612 and second volume 614, respectively. As the batch is processed and the brine concentration in the bags increases, negative buoyancy results and thus, subsurface support structures 1630 and 1632 may be used to support the fabric bags 1610A and 1610B as the brine increases.

Figure 17:
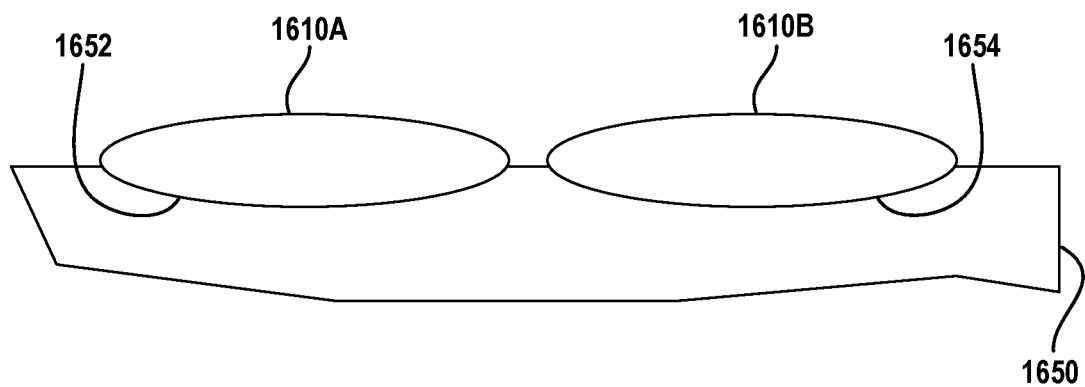
FIG. 17 is a side view of an on-land reverse osmosis tank system.

Referring now to FIG. 17, fabric bags 1610A and 1610B may be used on the land 1650. A sculpted surface 1652 and 1654 may receive bags 1610A and 1610B, respectively.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A reverse osmosis system in communication with a fluid reservoir comprising:
    a membrane housing comprising a reverse osmosis membrane therein, said membrane housing comprising a feed fluid input, a brine outlet and a permeate outlet;
    a charge pump;
    a high pressure pump;
    a plurality of valves disposed in a spool valve, said spool valve comprises a rod and a plurality of disks coupled to a linear actuator, said linear actuator positioning the disks in a first position and thereafter, a second position;
    a turbocharger comprising a turbine portion and a pump portion operatively coupled together;
    a first volume disposed in a first tank and a second volume disposed in a second tank;
    said charge pump selectively communicating feed fluid to the first volume of the first tank;
    wherein said plurality of valves are configured, in a first mode, to selectively couple the brine outlet to the second volume through the turbine portion and to selectively couple the feed fluid input to the first volume through the high pressure pump and the pump portion, and in a second mode, to selectively couple the brine outlet to the first volume through the turbine portion and to selectively couple the feed fluid input to the second volume to the feed fluid inlet through the high pressure pump and the pump portion; and
    wherein the first mode and the second mode are configured for alternating operation.

2. The reverse osmosis system of claim 1 wherein the spool valve comprises a low pressure end, a high pressure end and a seal between the low pressure end and the high pressure end.

3. The reverse osmosis system of claim 1 further comprising a controller and a concentration sensor generating a concentration signal corresponding to a salt concentration coupled to a drain line, said controller controlling a flushing of pipes with feed fluid until the salt concentration in the drain line is below a threshold.

4. The reverse osmosis system of claim 1 wherein the first tank and the second tank share a common wall.

5. The reverse osmosis system of claim 4 wherein the first tank is coaxial with the second tank.

6. The reverse osmosis system of claim 1 wherein the first tank comprises a first bag and the second tank comprises a second bag.

7. The reverse osmosis system of claim 6 wherein the first bag comprises a first fabric bag and the second bag comprises a second fabric bag.

8. The reverse osmosis system of claim 6 wherein the first bag is disposed adjacent to a sub-surface platform.

9. The reverse osmosis system of claim 6 wherein the first bag and the second bag are disposed in a sculpted surface.

10. A method comprising:
    filling a first volume disposed in a first tank and a second volume disposed in a second tank;
    producing permeate with fluid from the second volume by passing the fluid through a membrane of a membrane housing, said membrane housing comprising a feed fluid input, a brine outlet and a permeate outlet; and
    controlling a spool valve in response to a first volume concentration and a second volume concentration so that in a first mode, a charge pump is selectively coupled to the first volume while the brine outlet and the feed fluid input are connected to the second volume, and in a second mode, to selectively couple the charge pump to the second volume while the brine outlet and the feed fluid input are connected to the first volume, wherein the first mode and second mode are configured for alternating operation.

11. The method of claim 10 wherein controlling the plurality of valves comprises controlling the plurality of valves in response to a first volume concentration and a second volume concentration.

12. The method of claim 10 further comprising maintaining a constant permeate production rate until a concentration of fluid in the second volume reaches a threshold.

13. The method of claim 10 further comprising maintaining net driving pressure until a concentration of fluid in the second volume reaches a threshold.

14. The method of claim 10 wherein the first tank and the second tank have a common wall.

15. The method of claim 10 wherein the first tank comprises a first bag and the second tank comprises a second bag.

16. The method of claim 15 wherein the first bag comprises a first fabric bag and the second bag comprises a second fabric bag.

17. The method of claim 15 the first bag and the second bag are disposed in a body of water.

18. The method of claim 15 the first bag and the second bag are disposed in a body of water adjacent to a subsurface support structure.

* * * * *